June 5, 1956

Z. V. WEISEL 2,748,614

VARIABLE SPEED TRANSMISSION

Filed June 23, 1953

INVENTOR.
ZENAS V. WEISEL
BY Wm Edward Hann
Attorney

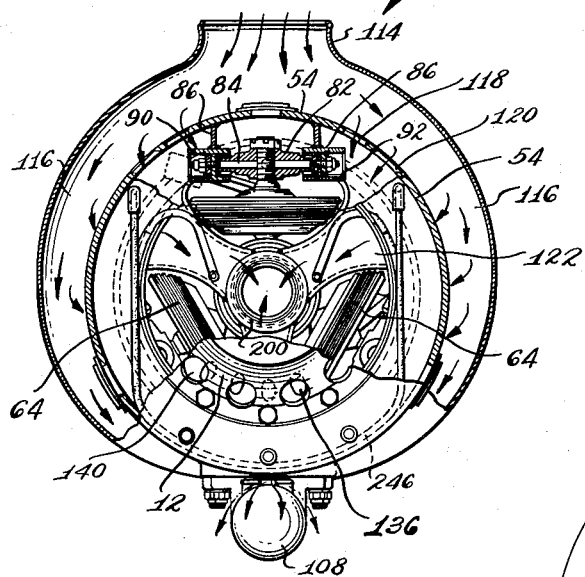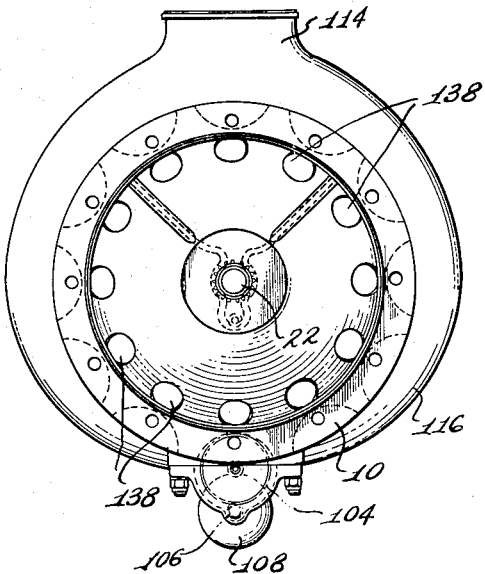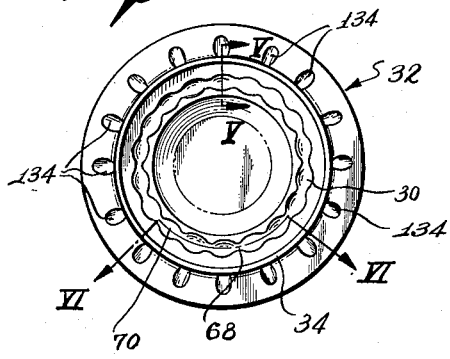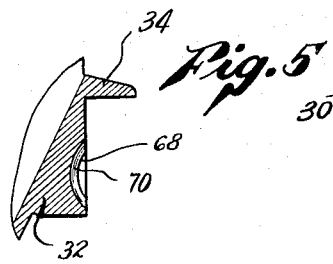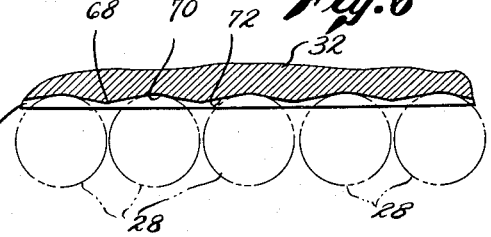

June 5, 1956     Z. V. WEISEL     2,748,614
VARIABLE SPEED TRANSMISSION
Filed June 23, 1953     6 Sheets-Sheet 3
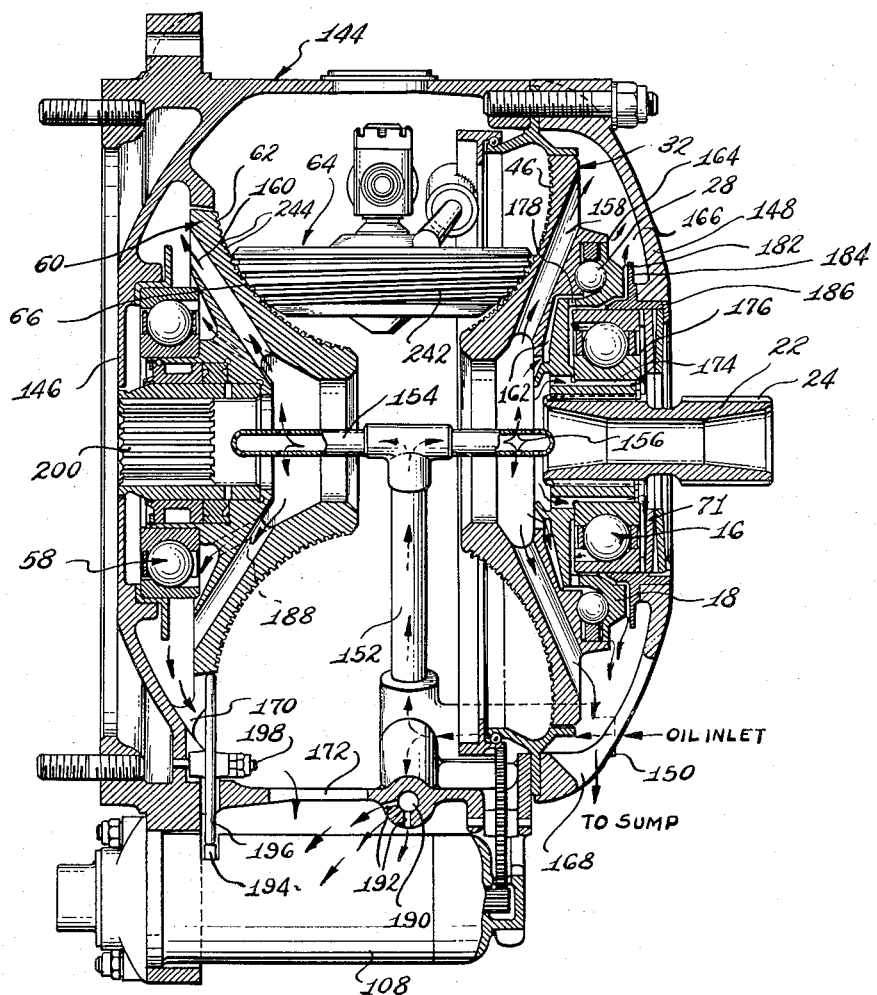
INVENTOR.
ZENAS V. WEISEL
BY Wm Edward Hann
Attorney

INVENTOR.
ZENAS V. WEISEL

June 5, 1956   Z. V. WEISEL   2,748,614
VARIABLE SPEED TRANSMISSION
Filed June 23, 1953   6 Sheets-Sheet 5
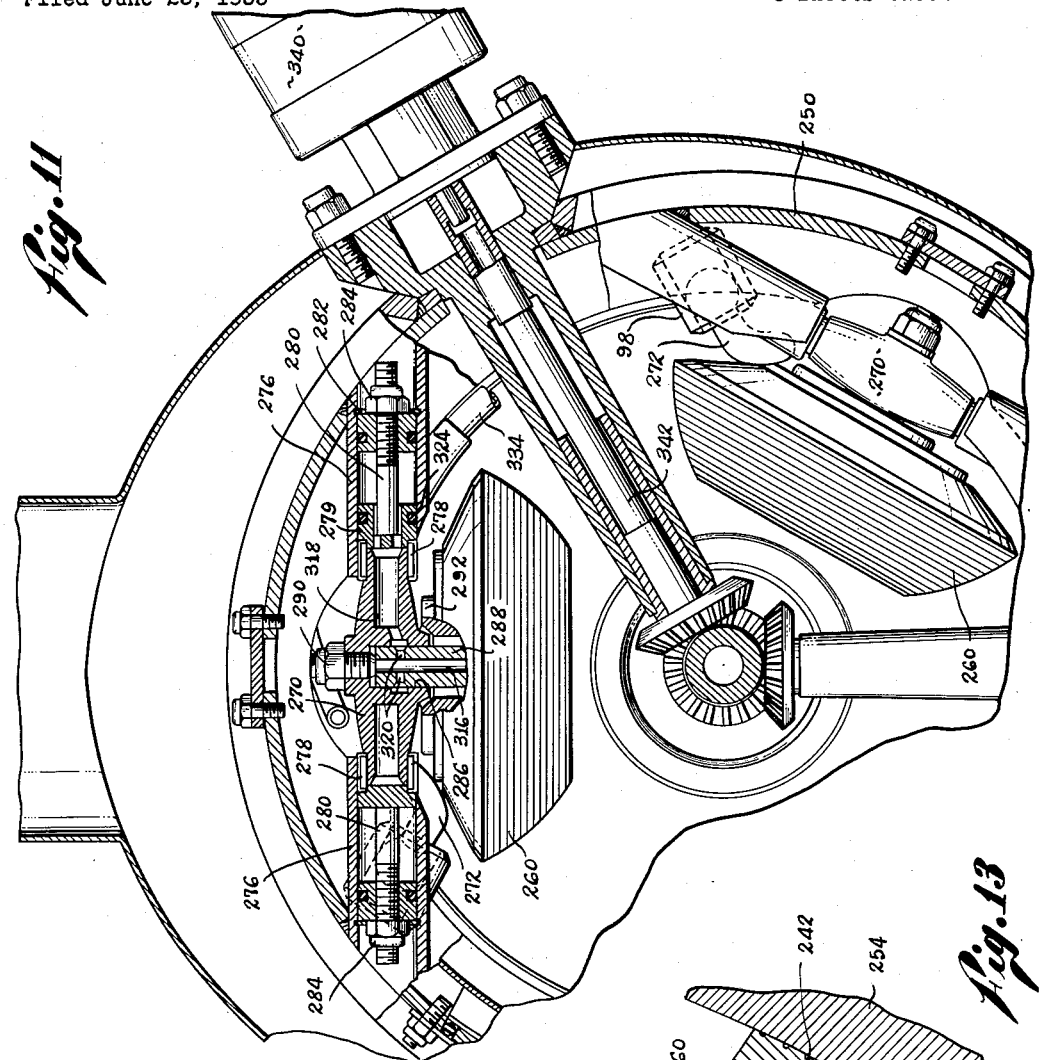
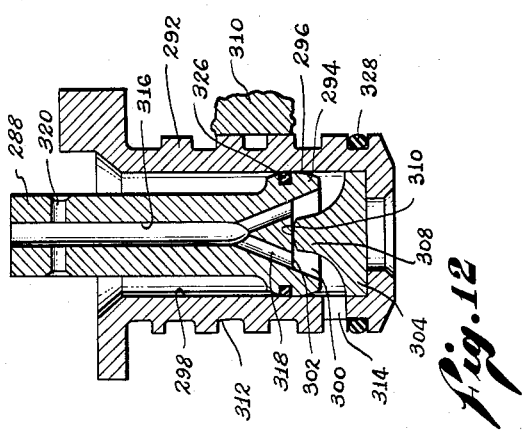
INVENTOR.
ZENAS V. WEISEL

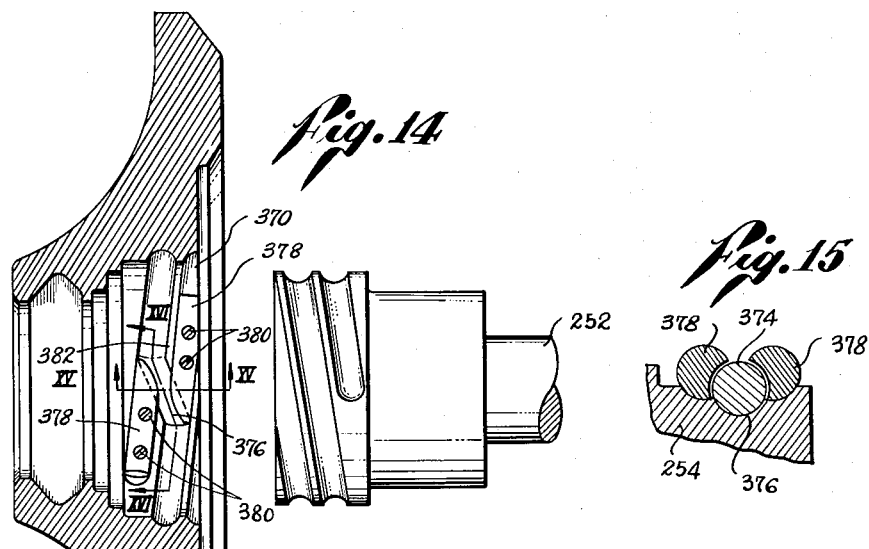
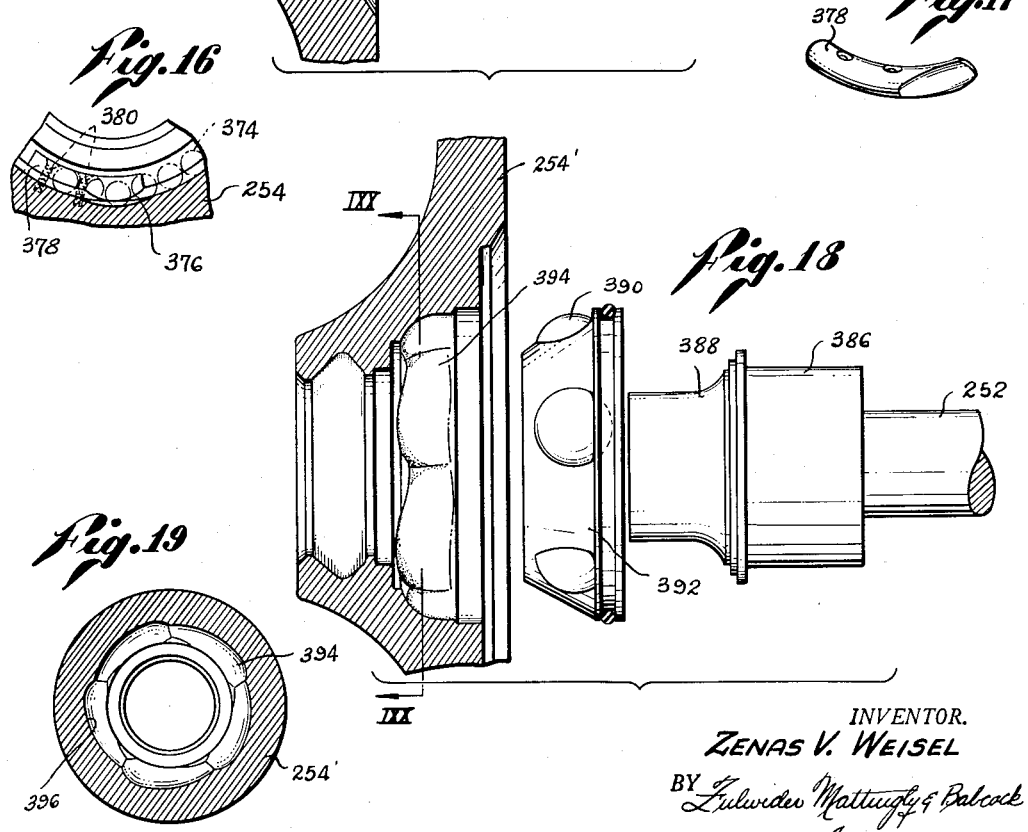

United States Patent Office 2,748,614
Patented June 5, 1956

2,748,614

VARIABLE SPEED TRANSMISSION

Zenas V. Weisel, Los Angeles, Calif.

Application June 23, 1953, Serial No. 363,606

11 Claims. (Cl. 74—200)

The present invention relates generally to transmissions and more particularly to an improved high speed transmission especially suitable for use in aircraft.

Modernly, there exists a need for a transmission adapted to connect a power source having a variable speed to a driven member which must rotate at a substantially constant speed despite variations in the load imposed thereon. One example lies in the driving of aircraft alternators. If a transmission is to be used in aircraft, it must additionally be light in weight, compact, and foolproof. Moreover, it must be capable of transmitting a high percentage of driving power into useful work over the wide speed range at which the power source may rotate. The primary purpose of the present invention is to provide a novel transmission embodying all of these qualities.

A major object of the present invention is to provide an improved high speed continuous, variable ratio transmission.

It is a further object of the present invention to provide a transmission incorporating complementary driving and driven discs defining opposed surfaces of revolution, which discs are bridged by one or more power-transmitting, conically-profiled rollers.

Another object is to provide a transmission of this nature which is very efficient at all speeds and under all load conditions.

It is yet another object to provide a transmission of this type wherein variation in the relative speeds of the discs can be infinitely controlled within maximum and minimum limits by changing the angularity of the bridging rollers relative to the discs; such rollers being mounted and controlled in a novel manner whereby they will follow a spiral path in moving from one position to another; and such rollers being so mounted and controlled that the traction forces have no tendency to change the angularity of the rollers.

Yet another object is to provide a transmission of this nature which will quickly and smoothly respond to any change in speed of the discs.

It is a still further object of the invention to provide a transmission of this nature incorporating improved integral air cooling for the driving and driven discs, as well as for the rollers; and to provide an improved lubrication system for such discs and rollers.

An additional object of the invention is to provide a transmission of this nature having novel means for mounting the rollers.

It is yet a further object of the present invention to provide a novel transmission of this nature having novel means for preventing slippage between the discs and the rollers.

Another object is to provide a transmission of this nature wherein tracking of the rollers on the discs is insensitive to deflections, differential expansion, tolerance variations in machining and to variations in power load.

Yet an additional object of the invention is to provide a transmission which is very compact and yet is capable of transmitting a large load over an extended period of time without requiring attention.

A further object is to provide a transmission utilizing wide-faced conoidal rollers which require the minimum roller-to-disc loading force relative to traction force.

These and other objects and advantages of the present invention will become apparent from the following detailed description when taken in conjunction with the appended drawings wherein:

Figure 2 is a reduced transverse vertical sectional view of said transmission showing the air cooling system and roller mounting thereof;

Figure 3 is an elevational view of the input side of said transmission;

Figure 4 is an elevational view of the input side of the driving disc member of said transmission;

Figure 5 is an enlarged fragmentary detail taken approximately on the line V—V of Figure 4;

Figure 6 is an enlarged fragmentary detail taken on line VI—VI of Figure 4;

Figure 7 is a longitudinal vertical sectional view through a transmission generally similar to that shown in Figure 1, illustrating a form of lubricating system which may be utilized therewith;

Figure 11 is a fragmentary vertical sectional view taken on line XI—XI of Figure 9;

Figure 12 is an enlarged vertical sectional view of a detail of Figure 9;

Figure 13 is a fragmentary enlarged view of the encircled portion XIII—XIII of Figure 9;

Figure 14 is an exploded and enlarged view of a variable torque control device utilized with the transmission shown in Figure 9;

Figure 15 is an enlarged horizontal sectional view taken on line XV—XV of Figure 14;

Figure 16 is a sectional view taken on line XVI—XVI of Figure 14;

Figure 17 is a perspective view of a scooping finger utilized in the torque control device of Figure 14;

Figure 18 is a view similar to Figure 14, but showing another type of variable torque control device which may be utilized with the transmission shown in Figure 9; and Figure 19 is a reduced vertical sectional view taken on line XIX—XIX of Figure 18.

Figure 1:
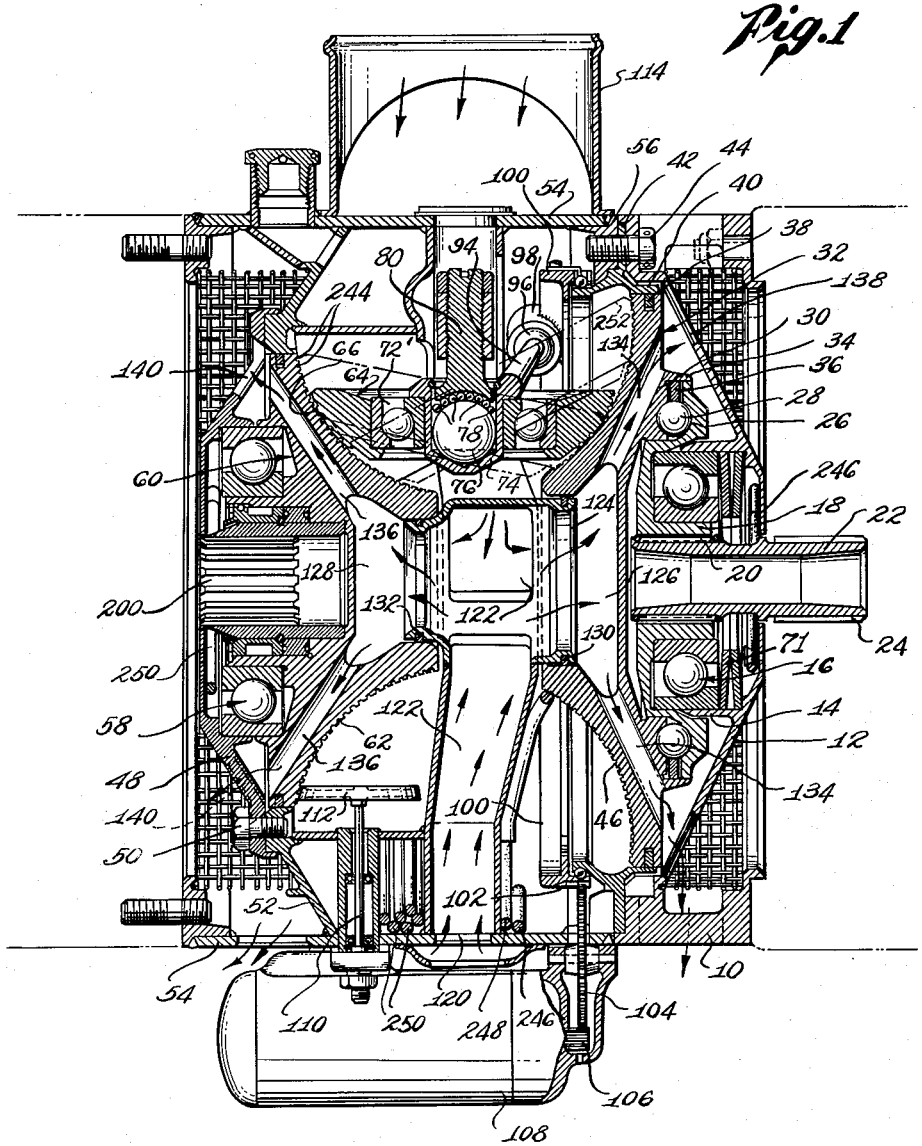
Figure 1 is a longitudinal vertical sectional view of a transmission embodying the present invention and including the air cooling system thereof.

Referring to the drawings, and in particular, to Figure 1 thereof, there is shown a right-hand end plate 10 having a frusto-conical portion 12 with a bearing flange 14 extending inwardly therefrom. The flange 14 supports a ball bearing assembly 16, and this bearing assembly rotatably supports a rotary cam plate 18. Disposed in the center of the plate 18, as shown at 20, is a stub shaft 22 having a keyed outer portion 24 adapted for driving connection with a suitable source of rotary power.

The cam plate 18 is provided with a ball channel 26 in which a series of balls 28 are located. The balls are retained with the aid of a complementary ball channel 30 in the input or outer side of a rotary input member or disc 32 having an outwardly directed flange 34 containing a bearing ring 36 which rides upon the balls 28.

The input disc 32 has a peripheral sealing ring 38 which bears against a stationary containing ring 40, the latter having a radial flange 42 connected by a series of bolts 44 to the end plate 12.

The left-hand side of the rotary input disc 32 is provided with a concave surface of revolution 46 which may approximate a toric section.

The structure is provided with a left-hand end plate 48 which is suitably connected by bolts 50 to an end ring 52 which lies in the left-hand portion of a cylindrical casing member 54. The right-hand end plate 12 has its bolts 44 threaded into a connector ring 56 which is suitably connected as by welding to the right-hand end of the cylindrical casing 54.

The left-hand plate 48 supports a ball bearing assembly 58 which, in turn, rotatably supports an output or driven disc 60. The disc member 60 is provided with a concave surface of revolution 62 which defines generally a toric section. Its profile may be approximately the same as that of driving disc member 32.

Interposed between the driving and driven disc members 32 and 60 are a plurality of power-transmitting conically profiled rollers 64; each roller having a convex surface of revolution 66. It is preferred that the conical profile surface 66 of the rollers 64 have a smaller radius than the profile surfaces 46 and 62 of the disc members 32 and 60.

The cam plate 18 and the driving disc member 32, with their ball grooves 26 and 30, respectively, are so constructed that increased torque on the drive shaft 22 will effect an increased axial pressure on the driving disc member 32, urging it toward the driven disc member 60. The ball channel 26 in the cam plate 18 is constructed similarly to the ball channel 30 in the driving disc 32; the latter being illustrated in detail in Figures 4, 5, and 6. In Figure 6, it will be seen that the bottom of the channel 30 has alternating high spots 68 and low spots 70 connected by inclined cam surfaces 72. When the cam plate 18 has torque applied thereto, the balls will tend to ride up the slanted cam surfaces 72 on the cam plate, as well as those of the driving disc member 32, thereby increasing the pressure of the driving disc member 32, against the rollers 64 and through said rollers to the driven disc member 60. The rollers are so mounted on spherical pivot 76 and trunnion 82 that they are free to pivot on 76 and to move in the general direction of the axes of the disc members so that substantially all of the force applied to the rollers at their point of contact with the driving disc member is transmitted to their point of contact with the driven disc member. When the torque is reduced, the balls 28 will tend to move toward low spots 70 and thereby reduce the above-mentioned pressure. Pre-loading of the cam plate 18 toward the driving disc member 32 may be provided by means of a Belleville-type dished pre-load spring 71.

The power-transmitting rollers 64 are each formed with an open central portion mounting a ball bearing unit 72; the inner portion of which carries a bearing cup 74. Located in the cup is a large ball 76 and a plurality of considerably smaller ball bearings 78 which are placed in the cup after the large ball 76 has been disposed therein so as to cover the surface thereof and thereby provide multiple point contact therewith. Extending into the open top of the cup 74 is a thrust member 80, the radially inner end of which has a surface formed as a portion of a sphere for contacting the small ball bearings 78. The upper portion of the thrust member 80 is formed with external threads in order that it may be threadedly secured to a trunnion shaft 82, as shown in Figure 2. Cylindrical housings 86 are rigidly secured to the main housing member 54. The ends of the trunnion shaft 82 extend through stationary partitions 90 in the cylindrical housings 86 and are provided with adjusting nuts 92 by means of which the trunnion shaft may be shifted longitudinally to properly center the power-transmitting roller 64 relative to the axis of rotation of the concave surfaces of revolution of the driving and driven disc members 32 and 60. The ends of the trunnion shaft 82 may be supported by needle bearings mounted in cylinders 86.

Extending from each of the bearing cups 74 in the rollers 64 is a roller actuating control or tilting arm 94 whose outer end is provided with a ball 96 which is housed within a cylindrical housing 98 welded on the side of a control ring 100. The control ring 100 is coaxial with the input and output discs 32 and 60, and is provided with external peripheral teeth 102 which mesh with teeth on a pinion 104, which latter pinion is also engaged with a pinion 106 secured to the shaft of a suitable servomotor 108. This servomotor should be able to provide quick starts and stops in combination with accurate stopping position. The servomotor mechanism is adapted to be controlled by means of a rotary shaft 110 which extends upwardly through the cylindrical main housing 54 and rigidly mounts a friction drive wheel 112, which drive wheel is in constant engagement with the concave surface 62 of the driven disc member 60.

The preferred form of air cooling system is shown in Figures 1, 2, and 3, and includes an inlet 114 which communicates with a divided supply manifold 116 extending downwardly about the casing 54. Air inlet apertures 118 and 120 are formed in the wall of the housing 54, to introduce air into conduits 122 which lead radially inwardly to a central manifold 124. The manifold 124 is open at both ends and is in flow communication with hollow hub portions 126 and 128 of the driving and driven disc members 32 and 60, respectively. The manifold 124 is stationary and is in coaxial alignment with the hollow hubs of the driving and driven disc members 32 and 60. Sealing rings 130 and 132 are interposed between each end of the manifold and the respective hubs of the driving and driven disc members. Radially extending air passages 134 and 136 connect the hollow hub portions 126 and 128 with the outer portions of the driving and driven disc members, which passages lie closely adjacent their respective concave surfaces of revolution 46 and 62. Hence, the input and output disc members serve as integral centrifugal pumps for creating a pressure differential that draws cooling air inwardly through conduits 122 and expel such air through apertures 138 and 140, and no special air pumps or fans are required for efficient cooling of the transmission. With this arrangement, these surfaces may be effectively air cooled. Air flowing through the passages 134 and 136 is exhausted through the right-hand end plate 12 by means of apertures 138 and apertures 140 formed in the left-hand end plate 48.

In Figure 7, there is disclosed a lubricating system and disc member cooling system which may be utilized in connection with a slightly different general structural arrangement of the main casing. The casing 144 is shown as having an integral left side wall 146 and a removable right side wall 148. The driving and driven disc members 32 and 60 are substantially identical to those shown in Figure 1, as are the power-transmitting rollers 64 and their component parts.

The lower portion of the casing 144 includes an oil inlet 150, the inner end of which conduit has an upwardly extending oil line 152 connected thereto provided with oppositely extending cross-arm sections 154. These cross-arm sections 154 are provided with outlet apertures 156, and it will be seen that the cross-arm sections extend into the hollow hubs of the driving and driven disc members 32 and 60. Radiating from the hollow hub portions are lubricant conduits 158 and 160 formed in disc members 32 and 60. With this arrangement, the conduits 158 and 160 will convey a cooling flow of oil in heat-transferring relationship with the disc members at points adjacent the traction surface thereof so as to dissipate the heat losses resulting from the contact between the rollers and the disc members. The cooling oil, however, is not permitted to flow over the engaging surfaces of the rollers and disc members whereby the danger of a build-up of oil in front of the contacting rotary surfaces 42, 62, and 66 of these elements is eliminated. Such a build-up is especially to be avoided because of the comparatively large width of these contacting rotary surfaces, as will be discussed more fully hereinafter.

A lubricant flow passage is formed by a space 162 between adjacent face portions of the cam plate 18 and the driving disc member 32, permitting flow of lubricant to the thrust transmitting balls 28 and thence outwardly at the point 164 into a space 166 inside of the end plate at each end of the housing 144. The right end plate 148 is provided with an oil drain outlet 168 leading to a suitable oil sump in an outer casing (not shown). The left end plate 146 defines an oil drain aperture 170 with the lower edge of the driven disc member 60 to permit the lubricant to flow through an opening 172 into the sump or other receiving means provided therefor.

An oil passage 174 extends through the cam plate 18 adjacent its central portion and communicates with a radial passage 176 so as to provide lubricant for the ball bearing assembly 16 in which the cam plate 18 is rotatably mounted. When oil flows through the ball bearing assembly 16, it is conducted through a small port 178 so as to communicate with the oil flow passage 162. A branch oil flow space 180 is defined between the outer portion of the bearing assembly 16 and a part of the cam plate 18. This space 180 is continued as shown at 182 between an outer portion of the cam plate 18 and a flange 184 formed on a bearing assembly ring 186, which ring fits into a large central opening in the right end plate 148. A conventional lubrication arrangement may be provided for the rotary support of the driven disc member 60, including lubricant passages 188 which provide oil for the bearing assembly 58. The lubricant inlet conduit 150 includes a branch 190 provided with outlet apertures 192 adapted to spray lubricant over the exterior of the servo motor 108. This lubricant drops into a suitable sump referred to above, but not shown in the drawing.

It should be noted that the servo motor control shown in Figure 7 differs somewhat from that shown in Figure 1. The servo motor 108 in Figure 7 mounts a wheel 194 on its main shaft, which wheel is in frictional contact with a wheel 196 supported on a stub shaft 198; the latter being carried by the left housing wall 146. The wheel 196 is in frictional drive contact with the peripheral edge of the driven disc member 60.

In both the embodiment of Figure 1 and that of Figure 7, an internally splined sleeve 200 is shown coaxially mounted in the center of the driven member 60. This sleeve is adapted to be drivingly connected with a constant speed unit which, in the case of an aircraft, may be an alternator, although this specific use is, of course, not intended to limit the application of the invention.

In Figures 1, 2, and 3, there is shown lubricating means which may be utilized in addition to that shown in Figure 7. A certain amount of lubricant is contained within the cylindrical casing 54. Located in the lower medial portion of the casing are capillary wicks 246 and 248 which are adapted to conduct small amounts of lubricant upwardly from the bottom of the casing. As shown in Figure 2, the wick 246 extends upwardly in two directions from the bottom of the housing 54 and thence radially inwardly as shown in Figure 3, to extend partially around the hollow driving shaft 22. The wick 248 extends upwardly in the housing 54 to wipe against the inner portion of the concave surface 46 on the driving disc member 32. Similarly, a wick 250 extends from the lower portion of the housing 54 to the outside of the internally keyed sleeve 200 in the driven disc member 60. This wick-type oiling system automatically meters the relatively minor amount of oil required for lubrication of the traction surfaces of the rollers and disc members, as well as the ball bearings, and limits the quantity of oil splashed onto these traction surfaces. This system is particularly applicable to the form of transmission shown in Figure 1. It should be noted that by the ultilization of such wick-type oiling system, the need of a special oil pump and the accessories therefor is eliminated.

It will be observed that the rollers 64 and the disc members are formed with spirally extending grooves 242 and 244, respectively, on their contacting surfaces. These grooves 242 and 244 serve to prevent the occurrence of a power loss at high rotational speeds of the discs and rollers resulting from the build-up of lubricant in front of the contacting rotary surfaces 42, 62, and 66, of these elements. Without this grooving such build-up of lubricant on these surfaces may form a wedge which tends to effect the separation of the rollers relative to the discs. When such grooving is utilized, however, the trapped lubricant has only to flow a short distance along the contacting surfaces into a groove. It has been determined that the depth of the grooves may be very shallow and in Figures 1, 2, 7, and 9, their size is exaggerated in the interest of clarity. Although this grooving is shown as having a spiral configuration in order that it may impart a pumping action to the lubricant, the grooves may instead be formed as a plurality of axially-spaced circumferential grooves. Moreover, the grooving may be formed on the rollers alone, while the contact faces of the disc member are made smooth. It should likewise be particularly noted that although such grooving is especially adapted for use in conjunction with a transmission of the type disclosed herein, it may also find use in other applications involving rapidly rotating contacting rotary surfaces.

Figure 8:
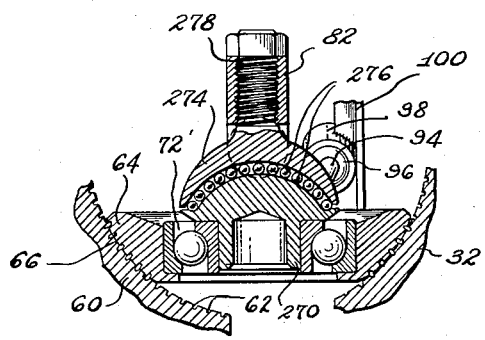
Figure 8 is an enlarged sectional view of an alternate form of roller mounting.

In Figure 8, there is illustrated a modified form of mounting for the rollers 64. Each of these rollers 64 and bearing assemblies 72' are generally similar to those shown in Figure 1. The bearing assembly is carried on a reduced portion of an upwardly convexly shaped bearing support 270, while a concave cup 274 is positioned above the bearing support. The position of the center of the radius of curvature of the convexly shaped portion of the bearing support 270 and of the concave portion of the cup 274 should be located on the axis of rotation of roller 64 and should preferably lie in or near the plane containing the center of contact of this roller with the driving and driven disc members 32 and 60. The bearing support 270 and the cup 274 confine a plurality of relatively small ball bearings 276. The cup 274 is supported by a threaded spindle 278 and may be mounted in the trunnion shaft 82 in the same manner as the first-described power-transmitting roller mounting. Preferably, however, the cup 274 and spindle 278 will be made integral with the cross-arm 82.

In operation, the input shaft 22 is adapted to be connected to a rotary source of power whereby it may rotate the cam plate 18 and driving disc member 32. Rotation of the latter member effects a concurrent rotation of the rollers 64 and hence of the driven disc member 60. The latter disc member in turn rotates the internally keyed sleeve 200 so as to drive an aircraft alternator, or the like. For effective use, such an alternator must be driven at a substantially constant speed. It is contemplated that so long as the driven disc member 60 rotates at a constant speed, the servo motor will remain stationary. If, however, the driven disc member 60 has its speed of rotation reduced, the servomotor mechanism will operate to partially rotate the control ring 100 and thus shift the roller actuating control arms 94. This in turn causes a tilting of each of the rollers 64 about an axis in a plane containing the axes of rotation of the driving and driven disc members 32 and 60, said axis passing through the center of the contact of each roller with the driving disc and the center of contact of the roller with the driven disc. The transmission shown in Figure 1 is adapted for a counterclockwise direction of rotation of its input shaft 22 when viewed from the front or input side thereof. If the roller actuating arms 94 are raised from the position of Figure 1, it will cause the rollers 64 to move in a spiral direction relative to the profiles of the concave friction surfaces 46 and 62 on the disc toward the dotted line position 252 of Figure 1. The rollers 64 will each ride outwardly on the concave surface of the driving disc member 32 and inwardly on the concave surface of the driven disc member 60 during such movement. During this movement of the rollers, the loads carried thereby continue to be carried by the trunnion shafts 82, these shafts rotating about their longitudinal axes within the bearings mounted in the fixed cylinders 86. This will increase the speed of the output member 60 until it has again reached the proper speed. It should be noted that raising of the control arms 94 as described hereinabove serves to shift the axis of rotation of each of the rollers 64 whereby they no longer intersect the axis of rotation of the disc members 32 and 60. The control arms thus steer the rollers 64 from one ratio position to a new ratio position. When the rollers reach the new ratio position their individual axes of rotation will again automatically intersect that of the disc members. During the time the rollers are moving bodily to their new ratio positions the contact path of each of the rollers 64 actually spiral when their angle is being changed. The fact that the rollers 64 actually spiral to a new position, rather than merely skid to a new position, provides very definite advantages, since a minimum loss of traction takes place during such roller movement. Accordingly, minimum loading of the rollers is required, less wear of the various parts of the device will take place, a high efficiency may be obtained because of the low heat loss, and the size of the transmission may be small as compared to its capacity. Furthermore, a minimum amount of control force need be utilized whereby the size and weight of the control mechanism may be kept small.

When the roller actuating control arms 94 are each tilted as mentioned, the relative arrangement of each arm to the ball 76 in the roller cup 74 and also relative to the roller trunnion shaft 82 is such that for a predetermined degree of tilt of the control arm 94, each roller 64 will move to a definite ratio position and reach a point of equilibrium in a plant normal to the axis of the roller thrust member 80, that is, with its axis of rotation intersecting that of the disc members. As a result, it will be seen that the device will act promptly and accurately in response to movement of the servo motor mechanism and that this mechanism will move in response to fluctuations in speed of the driven disc member 60. Although the rollers 64 have shown and described as being provided with a pivot in their center on an axis which passes through the center of contact of each roller with both disc members, it should be noted that the rollers can be caused to spiral from one ratio position to another even if this pivot center is disposed above or below this axis. The advantage of having the axis pass through the center of contact of the roller with the disc members is that the traction forces will have no moment arm through which a reaction with the control system could occur. In certain instances, however, it may be desirable to locate the pivot axis above or below this axis, in order to effect an automatic control of the ratio position responsive to a predetermined traction force action on the rollers. Such traction forces would tend to rotate the control ring 100, which rotation could be resisted by resilient means such as a spring or hydraulic piston-cylinder device whereby the ratio position would be controlled by the traction force on the rollers.

During operation, assuming the driven sleeve 200 is connected to a device such as an alternator, if a sudden increase in the power load occurs, it will require that an increase in torque be supplied by the power source to the input shaft 22. Under such conditions, the cam plate 18 will tend to rotate relative to the driving disc member 32, causing the cam balls 28 to ride up the incline 72 in their ball grooves 26 and 30, and impart a greater axial thrust on the disc member 32. This creates greater compressive forces between the driving and driven disc members 32 and 60 relative to the convex surface 66 of each roller 64 to permit each roller to transmit the increase in traction force required by the additional torque without slip at the traction surfaces. When the power load returns to normal, the torque input may be reduced to normal again so that there is then a reduced thrust imparted by the cam plate 18 whereby the cam balls 28 may roll down the incline 72 and thus impart a reduced axial thrust on driving disc member 32. This serves to reduce the compressive forces between the rollers 64 and the disc members 32 and 60 so as to improve the overall efficiency of the device at part load and to permit its parts to have a longer service life.

In this regard, it should be particularly noted that the radius of the profile surface 66 of each roller 64 is less than the radius of the profile surfaces 46 and 62 of the disc members 32 and 60. Accordingly, during such part load conditions, the contact path between the rollers and the discs is relatively much narrower than when under full power load, and hence the departures from true rolling which occur in the contact path and which produce a certain amount of friction power loss and some heat are considerably reduced over that for full power. Additionally, since this contact path is narrower at part load, the power loss resulting from the build-up of oil in front of the contacting rotary surfaces 42, 62 and 66 will be less than at full load. Since this is true, wear between these surfaces will be at a minimum. Under full or near-full load conditions, however, it has been determined that the roller surfaces 66 will actually deform so as to approximate the curvature of the disc surfaces 46 and 62 by virtue of the increased axial thrust imparted upon the driving disc 32. Because of such deformation, it would be undesirable to have the radius of the profile surface 66 of the rollers 64 equal to the radius of the profile surfaces 46 and 62 of the disc members 32 and 60. This is true since even very slight deflection of these parts under an increase in load and/or a differential temperature expansion could cause the contact of the several rollers with the disc members to occur at different points on the disc members. Additionally, the contact point of an individual roller could exist at different points on each disc member. The effect of such conditions would be an increased power loss, increased stress, and indefinite control over the rollers. The practical difficulty of machining and fabricating the transmission if these radii were equal, will also be evident.

Referring now to Figures 9 through 17, there is shown another form of transmission embodying the present invention, which transmission broadly comprises a cylindrical casing 250 wherein are mounted an input shaft 252 adapted to rotate an input disc member 254, an output shaft 267 adapted to be rotated by an output disc member 258, and a plurality of power-transmitting conically profiled rollers 260 having a convex surface of revolution 262. The radius of the surface 262 of each roller is less than the radius of the profile surfaces 264 and 266 of the disc members 254 and 258, respectively. The output or driven shaft 256 is formed with splines 268 for receiving the shaft of an aircraft alternator, or the like (not shown). Each of the rollers 260 is supported by a trunnion shaft 270 that is rotatable about its longitudinal axis when the roller is tilted by means of a tilting arm 272. The tilting of these arms is in turn effected by a control ring 100 which is connected to cylindrical housings 98 and to a servomotor (not shown) in the same manner as set forth with regard to the transmission shown in Figure 1 or in Figure 7. It is contemplated, however, that other types of speed-sensing mechanisms may be utilized for controlling the control ring 100.

As shown in Figure 11, the ends of the trunnion shafts 270 are disposed within fixed cylinders 276 and needle bearings 278 permit relative rotation therebetween. Adjustment of the shaft 274 with respect to these cylinders 276 may be effected by means of a pair of pusher elements 279 coaxially slidably carried within these cylinders, such pusher elements including threaded rods 280 supported within rings 282 and mounting lock nut 284. The mid-portion of each trunnion shaft 270 is formed with a bore at 286 to slidably receive the outer end of a thrust member 288. An adjustment stud and nut combination 290 is mounted by each trunnion shaft for obtaining the proper adjustment of the thrust member 288 relative thereto.

Referring to Figure 12, the thrust member 288 is coaxially disposed within a thrust cup 292, which cup is in turn coaxially encircled by the roller 260. The radially inner end of the thrust member 288 is formed with a flange 294 having spherically curved sides 296 adapted to bear against radially inner side wall 298 of the thrust cup 292. The radially inner end of the thrust member is formed with a cavity 300 having a generally flat end wall 302. A pivot element 304 is disposed against the end wall 306 of the cup 292 so that its center portion 308 may bear against the end wall 302. This center portion 308 is spherically curved as indicated at 310 whereby there is provided a substantially frictionless pivot point between the thrust member 288 and the thrust cup 292. With this arrangement, during movement of the tilting arms 272 to change the ratio position of the rollers 260, the thrust cups 292, and hence the rollers 260 may undergo pivotal movement independently of the thrust members 288. In this manner, the rollers 260 are free to spiral to their new position even though the required amount of radially inwardly directed force is being applied thereto by means of the thrust members 288.

As indicated in Figure 13, only the rollers 260 are formed with oil relief grooves 242 in this form of the invention, the contact faces of the input and output disc members being smooth.

Figure 9:
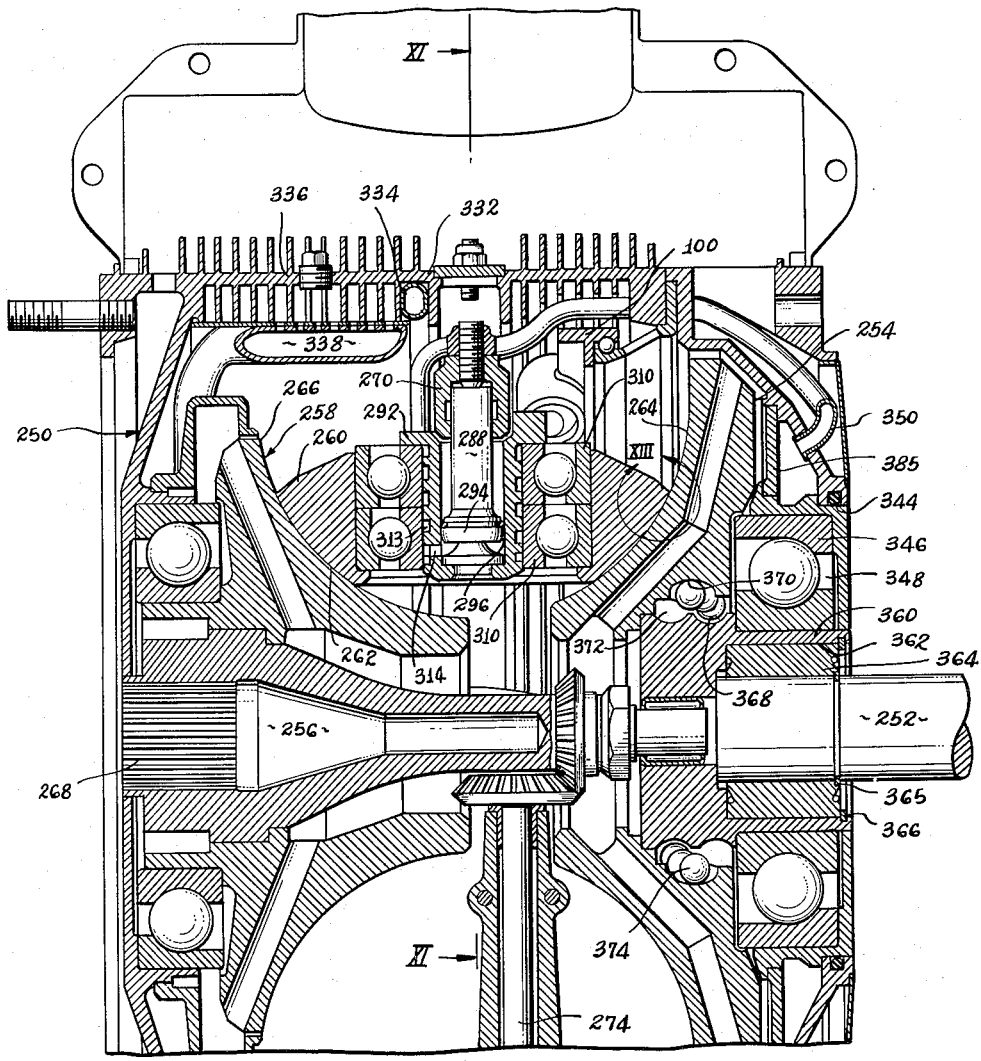
Figure 9 is a longitudinal sectional view of another form of transmission embodying the present invention.
Figure 10:
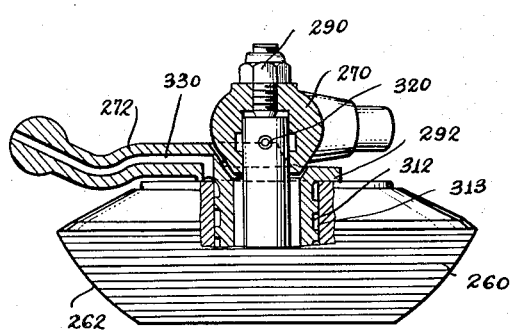
Figure 10 is a vertical sectional view illustrating the roller mounting utilized in the transmission of Figure 9.

As shown in Figure 9, the rollers 260 are rotatably supported by a pair of axial thrust type ball bearings 310, the inner peripheries of which encircle the thrust cups 292. The outer portion of each thrust cup is formed with a spirally curved groove 312, whereby an oil conducting passage 313 is defined when the ball bearings and thrust cups are assembled. The lower end of this passage 313 is connected to the inside of the thrust cup below the thrust member flange 294 by a short bore 314. This portion of the thrust cup cavity is in turn in communication with an axial bore 316 extending through the thrust member 288 by auxiliary bores 318. Referring to Figure 11, the thrust member's axial bore 316 receives oil by means of a cavity 318 formed in one side of the trunnion shaft 270 and transverse bores 320 formed in the thrust member; the cavity 318 being connected by a branch to oil line 334. O-rings 324, 326, and 328 may be provided for sealing the circulated oil.

The oil entering the lower end of the passage 313 will be urged radially outwardly therethrough during operation of the device. The upper or opposite end of passage 313 empties into a passage 330 formed through the center of the tilting arm 272. This latter passage 330 empties into the main housing out of communication with the roller path. The oil line 334 encircles the interior of the casing 250 and receives oil under pressure from an oil pump (not shown) mounted at the bottom of the casing and driven by the shaft 274. With this arrangement, the bearings 310 may be provided with a cooling agent that follows a closed path and hence will not come into contact with the contact surfaces of the rollers and the disc members. The oil circulated through the casing may be cooled by contact with the upper cooling fins 336, such oil being conducted thereto by a manifold member 338, as shown in Figure 9. A tachometer 340 driven by a shaft 342 is shown mounted at one side of the casing 250.

Referring again to Figure 9, the front end of the casing 250 is formed with a bore 344 wherein is mounted a bearing retainer cup 346, which cup in turn receives the outer race of a front ball bearing 348. The outer periphery of this cup 346 may be supplied with a cooling fluid, such as oil, by means of a conduit 350. The inner race of the ball bearing 348 encircles the front portion of a drive sleeve member 360, which latter member is formed with a blind bore 362. A plurality of free-wheeling sprag elements 364 are circumferentially arranged within the annular space separating the inner periphery of the blind bore 362 and the outer surface of the input shaft 252. These sprags are retained in this annular space by snap rings 365 and 366. The rear portion of the drive sleeve member 360 is of larger diameter than the front portion thereof and is formed with multiple spiral grooves defining a double thread 368. The input disc member 254 is formed with a complementary multiple spiral groove defining a double thread 370 whereby there is defined a spiral ball channel 372 wherein are disposed a plurality of balls 374.

As shown in Figures 14 through 16, the starting point of one thread of the double thread 370 is joined to the end of the other thread by a cross-over notch 376 which is in part defined by a pair of scooping fingers 378. These scooping fingers 378 may consist of curved rods that are secured to the input disc member 254 by means of bolts or screws 380. With this arrangement, if the input shaft 252 and hence the drive sleeve member 360 is rotated in a counterclockwise direction when viewed from the front, the balls 374 will also tend to roll in the channel 372 in a counterclockwise direction until they reach the cross-over notch 376. Since, as shown in Figure 16, this notch is deeper than the remainder of the ball channel 372 formed in the input disc member 254, the balls will roll outwardly sufficiently to be able to move up over the rib 382 between the two threads of the double lead thread 370 whereby they will be free to recirculate through the channel. During movement of the balls through the cross-over notch 376, the scooping fingers 378 provide a surface having a gentle curvature for guiding the balls through the notch. The ends of the scooping fingers may extend over the ends of the cross-over notch. The balls 374 will be free to continue to move slowly or walk around the ball channel 372 as long as the input shaft 252 is being rotated. Hence, these balls will not remain in any one position for an appreciable period of time, and accordingly they will not cause pitting of the walls of the ball channel during normal operation. If a sudden above normal load is imposed upon the alternator (and hence the driven disc member 258) whereby an increase in torque must be applied to the driving disc member 254, the balls will roll between the grooves 368 and 370 so as to screw the driving disc member to the left so as to increase the pressure of the driving disc member against the rollers 260 and through said rollers to the driven disc member 258. Inasmuch as the balls travel through the channel 372 with a random movement, there is little chance they will be disposed at the same given spot therein for any suddenly applied, above normal load. Hence, these balls will not cause a pitting of the walls of the channel when a sudden load is applied. A flexible, dished disc-type spring 385 provides pre-loading of the drive sleeve member 360 toward the input disc member 254, as shown in Figure 9. With the aforedescribed arrangement, a single ring of balls 374 may be employed. This is made possible by the use of a double-lead thread in the spiral channel 372.

Referring now to Figures 18 and 19, there is shown another form of torque varying means which may be utilized with a transmission constructed in accordance with the present invention in place of those shown and described hereinabove. This torque varying means is of an angular contact cam type and includes a drive sleeve member 386 which is adapted to be coupled to the input shaft 252 of a transmission such as that shown in Figures 9 through 16 in the same manner as the drive sleeve member 360 described above. The rear portion of the drive sleeve member 386 defines a smooth inner raceway 388 for a plurality of balls 390 carried by a retainer 392. The outer raceway 394 for such balls is formed at the front portion of the driven disc member 254'. This outer raceway 394 includes a plurality of pockets defining cam surfaces 396 which are inclined axially toward the driven disc member (not shown). In operation, upon the application of torque above that which will fully compress a pre-load spring, such as that designated 385 in Figure 9, the balls will tend to cam the input disc member to the left so as to increase the pressure of the input disc member 254' against the rollers (not shown) and through the rollers to the driven disc member (not shown). It should be particularly observed that the balls 390 continually move, or walk, relative to the smooth inner raceway 388 during operation of the transmission. Accordingly, the danger of the balls causing a pitting of this raceway is minimized. Although the outer raceway 394 may become slightly worn by the balls, such wear is spread over a greater arc than would be the case with the inner raceway. Furthermore, the contact stress of the balls will be lower on the outer raceway than on the inner raceway.

It will be understood that various modifications and changes may be made with respect to the foregoing detailed description without departing from the spirit of the invention or the scope of the following claims.

This is a continuation-in-part of application Serial No. 175,695, bearing the same title and filed by me July 24, 1950, now abandoned.

I claim:

1. In a transmission, having a frame that rotatably mounts a pair of opposed axially-spaced coaxial driving and driven disc members: a conically profiled roller bridging said disc members; a thrust cup forming the shaft of said roller and having its open end facing radially outwardly; a thrust member connected at an end to said frame and having its radially inner end disposed within said cup; a bearing encircling said cup, the outer portion of said roller rotating about said bearing; a control arm rigidly secured to the upper portion of said cup for effecting tilting thereof; an axially extending bore formed through said thrust member; a groove formed in the outer portion of said cup and extending axially therealong; means for conducting a cooling fluid to the radially outer portion of the bore formed in said thrust member; and, a passage formed through said arm and connected to said groove whereby a cooling fluid may be forced through said bore, groove and passage without contacting said members.

2. A transmission comprising: a frame; a driving shaft rotatably mounted by said frame; a driving disc member coaxially mounted by said shaft; a coaxial driven disc member rotatably mounted by said frame opposite to and axially spaced from said driving disc member; a roller interposed between said disc members in rotation-transmitting contact therewith; a trunnion shaft mounted by said frame; a thrust member extending inwardly from said trunnion shaft in a plane extending through the axis of rotation of said disc members; a thrust cup forming the shaft of said roller and having its open end facing said trunnion shaft; a pivot element disposed in the lower end of said cup in pivotal abutment with inner end of said thrust member; a bearing encircling said cup, the outer portion of said roller rotating about said bearing; a control arm rigidly secured to the upper portion of said cup for effecting tilting thereof; an axially extending bore formed through said thrust member; a spirally curved groove formed in the outer portion of said cup, said bore and said groove being in communication; a cavity formed in said trunnion shaft and connected with said bore; and, a passage formed through said arm and connected to said groove whereby a cooling fluid may be forced through said cavity, bore, groove and passage.

3. A transmission comprising: a frame; a driving shaft rotatably mounted by said frame; a driving disc member coaxially mounted by said shaft, said disc being movable axially relative to said shaft; a coaxial driven disc member rotatably mounted by said frame, said disc members having opposed axially-spaced concave surfaces of revolution approximating a toric section; a roller interposed between said disc members and having a convex surface of revolution in bridging contact with the concave surfaces thereof; a trunnion shaft mounted by said frame; a thrust member extending inwardly from said trunnion shaft in a plane extending through the axis of rotation of said disc members; a thrust cup forming the shaft of said roller and having its open end facing said trunnion shaft; a pivot element disposed in the lower end of said cup in pivotal abutment with the inner end of said thrust member; a bearing encircling said cup, the outer portion of said roller rotating about said bearing; a control arm rigidly secured to the upper portion of said cup for effecting tilting thereof; an axially extending bore formed through said thrust member; a spirally curved groove formed in the outer portion of said cup, said bore and said groove being in communication; a cavity formed in said trunnion shaft and connected with said bore; and, a passage formed through said arm and connected to said groove whereby a cooling fluid may be forced through said cavity, bore, groove and passage.

4. A transmission comprising: a frame; a driving shaft rotatably mounted by said frame; a driving disc member coaxially mounted by said shaft, said disc being movable axially relative to said shaft; a coaxial driven disc member rotatably mounted by said frame, said disc members having opposed axially-spaced concave surfaces of revolution approximating a toric section; a roller interposed between said disc members and having a convex surface of revolution in bridging contact with the concave surfaces thereof; a trunnion shaft mounted by said frame; a thrust member extending inwardly from said trunnion shaft in a plane extending through the axis of rotation of said disc members, the inner end thereof being formed with a flange having spherically curved sides; a thrust cup forming the shaft of said roller and having its cavity facing said trunnion shaft; and, a pivot element on the end wall of said cup, the inner end of said thrust member and the outer surface of said pivot element bearing against each other and permitting pivot action between said thrust member and said cup in all directions.

5. A transmission, comprising: a frame; a driving shaft rotatably mounted by said frame; a driving disc member coaxialy mounted by said shaft, said disc being movable axially relative to said shaft; a coaxial driven disc member rotatably mounted by said frame, said disc members having opposed axially-spaced concave surfaces of revolution approximating a toric section; a roller interposed between said disc members and having a convex surface of revolution in bridging contact with the concave surfaces thereof; a trunnion shaft mounted by said frame; a thrust member extending inwardly from said trunnion shaft in a plane extending through the axis of rotation of said disc members, the inner end thereof being formed with a flange having spherically curved sides; a thrust cup forming the shaft of said roller and having its cavity facing said trunnion shaft; and a pivot element disposed against the end wall of said cup, said element being formed with a spherically curved surface that bears against the flat inner end of said thrust member, the spherically curved sides of said flange bearing against the inner side walls of the cavity of said cup whereby said cup may pivot freely relative to said thrust member.

6. A transmission comprising: a frame; a pair of independently rotatable coaxial driving and driven disc members formed with spaced-apart opposed concave surfaces of revolution approximating a toric section; a conically profiled roller interposed between said disc members formed with a convex surface bridging the concave surfaces thereof; mounting means between said frame and said roller normally supporting said roller with its axis of rotation intersecting the axis of rotation of said disc members, said mounting means including a universal mounting for the roller and a tiltable member supporting said universal mounting; said control means independent of said mounting means for shifting the axis of rotation of said roller so that it no longer intersects the axis of rotation of said disc members in preparation for a change to a new ratio position wherein said axes will again intersect, said mounting means permitting said control means to steer said roller to said new ratio position, said roller moving bodily to said new ratio position with its surface in contact with the surfaces of said disc members undergoing substantially skid-free rolling movement in a spiral path along the latter surfaces.

7. A transmission comprising; a frame; a pair of independently rotatable coaxial driving and driven disc members formed with spaced-apart opposed concave surfaces of revolution approximating a toric section; a conically profiled roller interposed between said disc members formed with a convex surface bridging the concave surfaces thereof; mounting means between said frame and said roller normally supporting said roller with its axis of rotation intersecting the axis of rotation of said disc members, said mounting means including a universal mounting for the roller and a tiltable member supporting said universal mounting; and control means independent of said mounting means for shifting the axis of rotation of said roller so that it no longer intersects the axis of rotation of said disc members in preparation for a change to a new ratio position wherein said axes will again intersect, said mounting means permitting said control means to steer said roller to said new ratio position, said roller moving bodily to said new ratio position through an arc having a center contained in a plane extending through the axis of rotation of said disc members and coinciding with the center of curvature of the profile surfaces of said disc members at said plane, the surface of said roller in contact with the surfaces of said disc members undergoing substantially skid-free rolling movement in a spiral path along the latter surfaces.

8. A transmission comprising: a frame; a pair of independently rotatable coaxial driving and driven disc members formed with spaced-apart opposed concave surfaces of revolution approximating a toric section; a conically profiled roller interposed between said disc members formed with a convex surface bridging the concave surfaces thereof; mounting means between said frame and said roller normally supporting said roller with its axis of rotation intersecting the axis of rotation of said disc members, said mounting means including a universal mounting for the roller and a tiltable member supporting said universal mounting, the center of said universal mounting substantially coinciding with a line passing through the center of contact of said roller and disc members; and control means independent of said mounting means for shifting the axis of rotation of said roller so that it no longer intersects the axis of rotation of said disc members in preparation for a change to a new ratio position wherein said axes will again intersect, said mounting means permitting said control means to steer said roller to said new ratio position, said roller moving bodily to said new ratio position with its surface in contact with the surfaces of said disc members undergoing substantially skid-free rolling movement in a spiral path along the latter surfaces.

9. A transmission comprising; a frame; a pair of independently rotatable coaxial driving and driven disc members formed with spaced-apart opposed concave surfaces of revolution approximating a toric section; a conically profiled roller interposed between said disc members formed with a convex surface bridging the concave surfaces thereof; mounting means between said frame and said roller normally supporting said roller with its axis of rotation intersecting the axis of rotation of said disc members, said mounting means including a universal mounting for the roller and a tiltable member supporting said universal mounting, said tiltable member having a thrust element formed with a trunnion permitting said thrust element to tilt in a plane extending through the axis of rotation of said disc members, the axis of said trunnion being normal to said plane and extending through the center of curvature of the profile surfaces of said disc members at said plane; and control means independent of said mounting means for shifting the axis of rotation of said roller so that it no longer intersects the axis of rotation of said disc members in preparation for a change to a new ratio position wherein said axes will again intersect, said mounting means permitting said control means to steer said roller to said new ratio position, said roller moving bodily to said new ratio position with its surface in contact with the surfaces of said disc members undergoing substantially skid-free rolling movement in a spiral path along the latter surfaces.

10. A transmission comprising: a frame; a pair of independently rotatable coaxial driving and driven disc members formed with spaced-apart opposed concave surfaces of revolution approximating a toric section; a conically profiled roller interposed between said disc members formed with a convex surface bridging the concave surfaces thereof; mounting means between said frame and said roller normally supporting said roller with its axis of rotation intersecting the axis of rotation of said disc members, said mounting means including a universal mounting for the roller and a tiltable member supporting said universal mounting, said tiltable member having a thrust element formed with a trunnion permitting said thrust element to tilt in a plane extending through the axis of rotation of said disc members, the axis of said trunnion being normal to said plane and extending through the center of curvature of the profile surfaces of said disc members at said plane, the center of said universal mounting substantially coinciding with a line passing through the center of contact of said roller and disc members; and control means independent of said mounting means for shifting the axis of rotation of said roller so that it no longer intersects the axis of rotation of said disc members in preparation for a change to a new ratio position wherein said axes will again intersect, said mounting means permitting said control means to steer said roller to said new ratio position, said roller moving bodily to said new ratio position with its surface in contact with the surfaces of said disc members undergoing substantial skid-free rolling movement in a spiral path along the latter surfaces.

11. A transmission as set forth in claim 10 wherein said thrust element has a thrust-receiving free end, and said roller has a thrust-imparting element pivotally engaging said thrust-receiving free end.

References Cited in the file of this patent

UNITED STATES PATENTS

| 1,033,991 | Cotoli | July 30, 1912 |
| 1,774,176 | Erban | Aug. 26, 1930 |
| 1,775,479 | Arter | Sept. 9, 1930 |
| 1,813,957 | Robertson | July 14, 1931 |
| 1,979,170 | Nardone | Oct. 30, 1934 |
| 1,981,910 | Ehrlich | Nov. 27, 1934 |
| 2,076,560 | Hayes | Apr. 13, 1937 |

FOREIGN PATENTS

| 22,188 of 1899 | Great Britain | Jan. 27, 1900 |
| 673,168 | Great Britain | June 4, 1952 |